J. F. Keller,
Fertilizer Sower.
No. 105,811. Patented July 26, 1870.
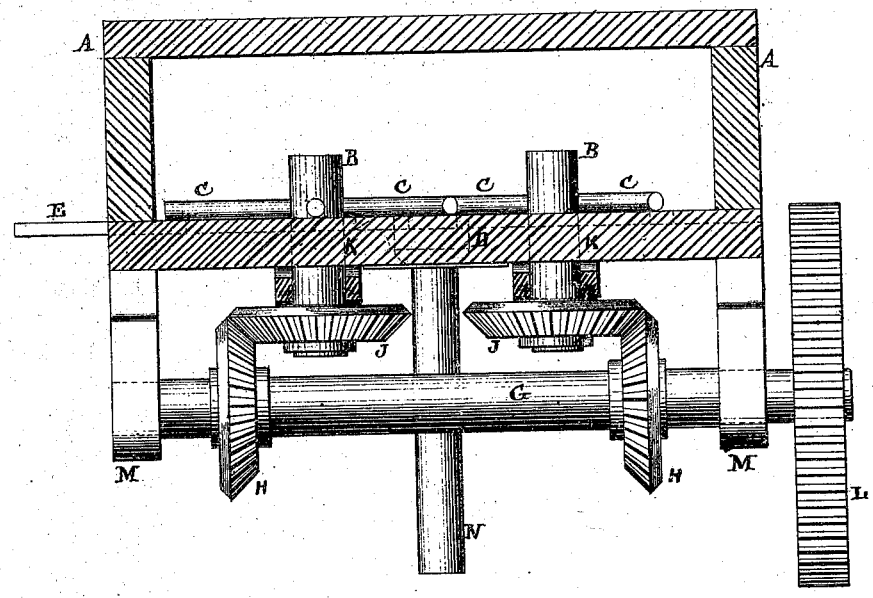
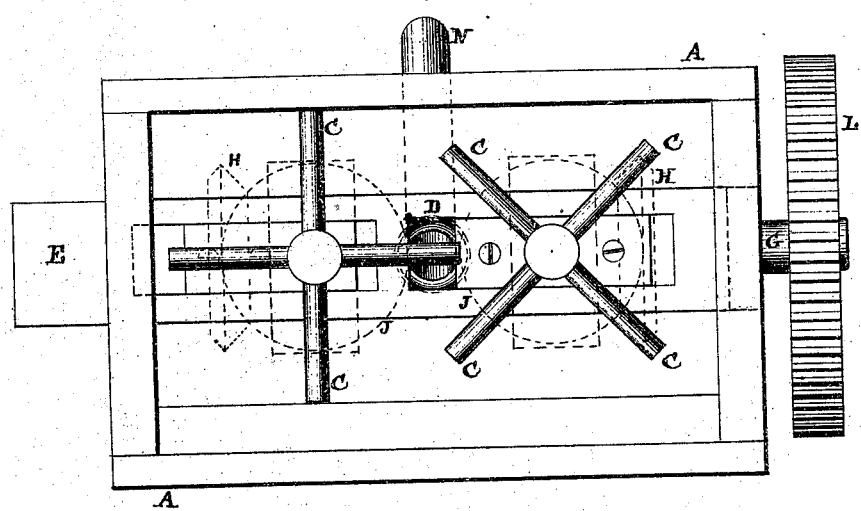

United States Patent Office.

JOHN F. KELLER, OF HAGERSTOWN, MARYLAND, ASSIGNOR TO HIMSELF AND WILLIAM UPDEGRAFF, OF SAME PLACE.

Letters Patent No. 105,811, dated July 26, 1870.

IMPROVEMENT IN FERTILIZER-ATTACHMENT TO SEEDING-MACHINES.

The Schedule referred to in these Letters Patent and making part of the same.

*To all whom it may concern:*

Be it known that I, JOHN F. KELLER, of Hagerstown, Washington county, State of Maryland, have invented Improvements in Movable Fertilizing-Hoppers to be attached to Seeding-Machines; and I do hereby declare the following to be an exact description thereof, reference being had to the accompanying drawings, and to the letters of reference marked thereon, making a part of this specification, in which—

Figure 1 represents a side elevation of the hopper, stirrers, and gearing or operating devices.

Figure 2, a top view of the same.

The nature of my invention consists in the construction of the movable hopper so as to be attached or detached, when required, to any drill or seeding-machine, and enable the farmer, when not using the fertilizer, to remove the hopper, with its attached devices, and lessen the draft to the team, saving, also, the expense and cost of the ordinarily-constructed fertilizers.

This fertilizing-hopper A can be attached to a grain-hopper by putting a projection on the bottom of a grain-hopper, so as to rest the lower edge of the portable fertilizing-hopper upon, and, with a rod or hook and eye at the upper ends of the hoppers, attach them together, thus enabling the operator to put on the fertilizing-hopper or remove it whenever required.

The difficulty heretofore experienced in sowing pasty or sticky fertilizers with a continuous feed was that the fertilizer, adhering to the feeders or stirrers, would form a solid revolving mass and close up the feed.

By my invention I overcome this difficulty and acquire a decided advantage. By placing two revolving shafts, B B, with four projecting spikes or feeders, C C, on them, on opposite sides of the aperture D, through which the fertilizing substance is discharged, the feeders C move over the aperture D, the feeder C of one being immediately followed by a feeder, C, on the opposite shaft, each feeder C moving alternately over the feed-aperture D, forcing the fertilizer through, and operating from different centers. They move over the aperture in different lines, cleaning and clearing each other and the aperture D, in their horizontal movement and work, of any adhesive substances.

For regulating the feed, an ordinary slide, E, is located and adjusted in the bottom of the hopper A.

The devices for driving these shafts and feeders consist simply of a shaft, G, with small bevel-wheels H H, driving similar bevel-wheels, J J, attached to the shafts B B of the feeders C C.

The feeder shafts B work in boxes K in the bottom of the hopper A, and similar boxes beneath the bottom, leaving an aperture for the fertilizer to pass out that might work into the shaft-boxes.

The main shaft G, on which the bevel-wheels H are placed, is driven by an ordinary cog-wheel, L, worked by a cog-wheel commonly used for driving grain-sowers.

The main shaft G is held to its place by boxes M M, placed underneath the hopper.

N is a spout through which the fertilizing substance is discharged.

What I claim as my invention, and desire to secure by Letters Patent, is—

The combination and arrangement of the two revolving shafts, B B, having four feeders, C C, on opposite sides of the feed-hole D, when operated by the gearing devices G, H, J, and M, as herein described, and for the purposes set forth.

JOHN F. KELLER.

Witnesses:
Z. B. CLARK,
WM. BARSHANG.